(12) United States Patent
Dryja

(10) Patent No.: US 8,256,825 B1
(45) Date of Patent: Sep. 4, 2012

(54) VEHICLE BODY STRUCTURE

(75) Inventor: Richard J Dryja, Plymouth, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/042,990

(22) Filed: Mar. 8, 2011

(51) Int. Cl.
*B60J 5/10* (2006.01)

(52) U.S. Cl. ..................... 296/146.8; 296/106

(58) Field of Classification Search ............. 296/106, 296/146.8, 56
See application file for complete search history.

(56) References Cited

U.S. PATENT DOCUMENTS

| | | | |
|---|---|---|---|
| 3,729,223 A | 4/1973 | Leissa | |
| 4,908,908 A | 3/1990 | Mitsuoka et al. | |
| 7,021,698 B2 | 4/2006 | Yamada et al. | |
| 7,618,084 B2 | 11/2009 | Kimura | |
| 7,669,916 B2 | 3/2010 | Munenaga et al. | |
| 7,690,715 B2 | 4/2010 | Hakumata et al. | |
| 2006/0071505 A1* | 4/2006 | Ciavaglia et al. | ........ 296/146.11 |

FOREIGN PATENT DOCUMENTS

| | | |
|---|---|---|
| JP | 61-189964 U | 11/1986 |
| JP | 2-76517 U | 6/1990 |
| JP | 2000-071776 A | 3/2000 |
| JP | 2005-075221 A | 3/2005 |
| JP | 2006-321417 A | 11/2006 |
| JP | 2007-176300 A | 7/2007 |
| JP | 2007-290566 A | 11/2007 |
| JP | 2008-013017 A | 1/2008 |
| JP | 2008-013018 A | 1/2008 |

* cited by examiner

*Primary Examiner* — Dennis Pedder
(74) *Attorney, Agent, or Firm* — Global IP Counselors, LLP (57) ABSTRACT

A vehicle body structure comprises at least one vehicle body panel, a hinge and a vehicle door. The vehicle body panel includes a roof ditch that is defined by a recessed support surface, a first wall surface and a second wall surface. The second wall surface is disposed outboard of the first wall surface. The hinge includes a base component and an arm component. The arm component is pivotally coupled to the base component. The base component is mounted to the recessed support surface of the roof ditch. The arm component includes a vehicle door mounting structure. The vehicle door is fixed to the arm component by the vehicle door mounting structure, which defines at least one fastening point that is situated at a location outboard of the second wall surface of the roof ditch.

20 Claims, 10 Drawing Sheets

VEHICLE BODY STRUCTURE

BACKGROUND

1. Field of the Invention

The present invention generally relates to a vehicle body structure. More specifically, the present invention relates to a vehicle body structure having a mounting arrangement for pivotally coupling a vehicle door to a vehicle body.

2. Background Information

Many vehicles such as station wagons, support utility vehicles and mini vans include a rear door (e.g., a tailgate or a lift gate) that is pivotally mounted to pivot about horizontal axes in order to access a rear cargo space. Such rear doors are typically mounted to the vehicle body by a pair of lift gate hinge assemblies located at the top end of the lift gate. Typically, such lift gates are heavy, and thus, the lift gate be mounted to a strong structural portion of the vehicle. In most cases, the lift gate hinge assemblies are mounted at the rear end of the vehicle roof. In some vehicles, the lift gate hinge assemblies are mounted to an exterior surface of the vehicle roof. In order to make the exterior of the vehicle more aesthetically pleasing, the lift gate hinge assemblies are occasionally mounted in the roof ditches of the vehicle roof and covered with a molding. Also, the hinge assemblies can be mounted to the side edges of the lift gate so that are not readily visible when the lift gate is closed. Thus, the freedom of the layout of components for the vehicle's rear end tends to be constrained by the configuration and structural mounting requirements of the lift gate hinge assemblies.

SUMMARY

One object of the present disclosure is to provide a vehicle body structure that improves design freedom by reducing constraints that limit the positioning of roof ditches with respect to outer door edges.

Another object of the present disclosure is to provide a vehicle body structure that increases interior roominess by utilizing the roof ditch as a hinge mounting location.

Still another object of the present disclosure is to provide a vehicle body structure that reduces the need for reinforcement panels.

Still another object of the present disclosure is to provide a vehicle body structure that increases torsional rigidity of the overall door assembly.

In view of the state of the known technology, one aspect of the present disclosure is to provide a vehicle body structure that basically comprises at least one vehicle body panel, a hinge and a vehicle door. The at least one vehicle body panel includes a roof ditch. The roof ditch is defined by a recessed support surface, a first wall surface extending longitudinally along a first side of the recessed support surface and a second wall surface extending longitudinally along a second side of the recessed support surface. The second wall surface is disposed outboard of the first wall surface. The hinge includes a base component and an arm component. The arm component is pivotally coupled to the base component. The base component is mounted to the recessed support surface of the roof ditch. The arm component includes a vehicle door mounting structure. The vehicle door is fixed to the arm component by the vehicle door mounting structure, which defines at least one fastening point that is situated at a location outboard of the second wall surface of the roof ditch.

These and other objects, features, aspects and advantages of the vehicle body structure will become apparent to those skilled in the art from the following detailed description, which, taken in conjunction with the annexed drawings, discloses one embodiment.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
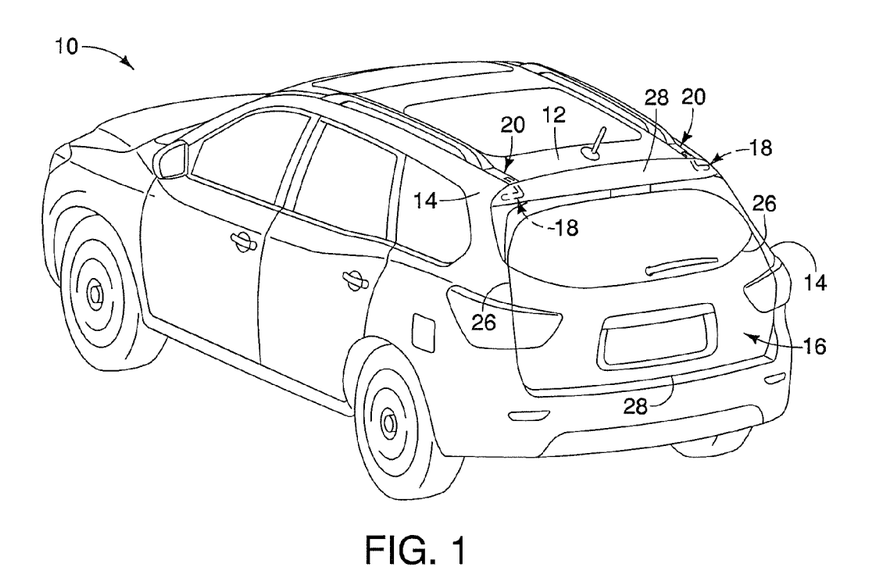
FIG. 1 is a rear perspective view of a vehicle having a vehicle body structure with a door mounting arrangement for pivotally coupling a vehicle door to a vehicle body in accordance with one illustrated embodiment.
Figure 2:
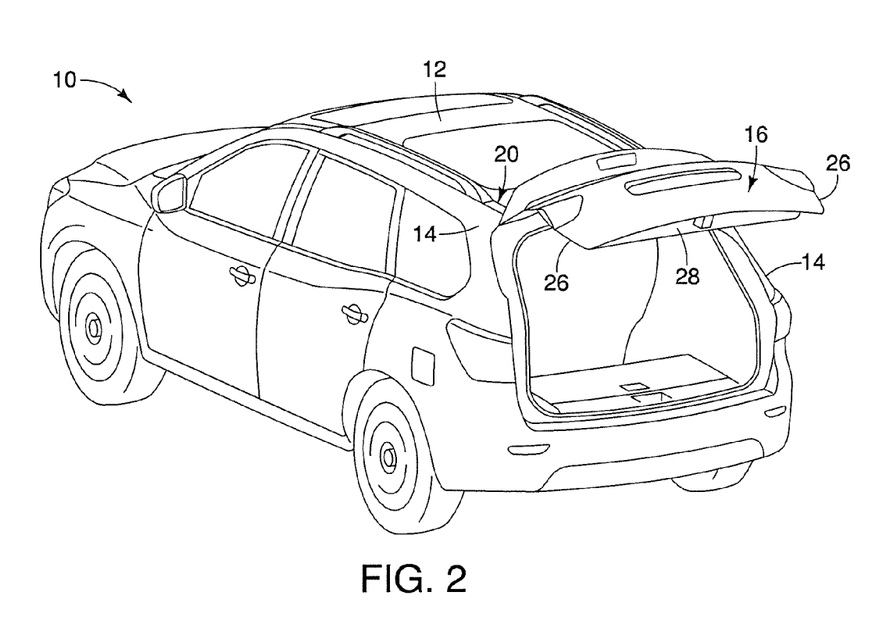
FIG. 2 is a rear perspective view of the vehicle illustrated in FIG. 1, with the vehicle door pivoted to an open position.

Referring initially to FIGS. 1 and 2, a vehicle 10 is illustrated in accordance with a first embodiment. The vehicle 10 includes, among other things, a roof panel 12 and a pair of side panels 14 that together with other panels form a vehicle body. The roof panel 12 and the side panels 14 are typically formed of one or more pieces of sheet metal or any other suitable material that is welded together to form a substantially rigid portion of the vehicle body. Also the roof panel 12 and/or the side panels 14 can be supported by other structural members as needed and/or desired. The vehicle 10 also includes a vehicle door 16 that is typically formed of metal or any other suitable material and is pivotally mounted to the roof panel 12 by a pair of hinges 18. The hinges 18 are typically made of metal or any other suitable rigid material having sufficient strength and durability to support the vehicle door 16 in the open position.

Figure 8:
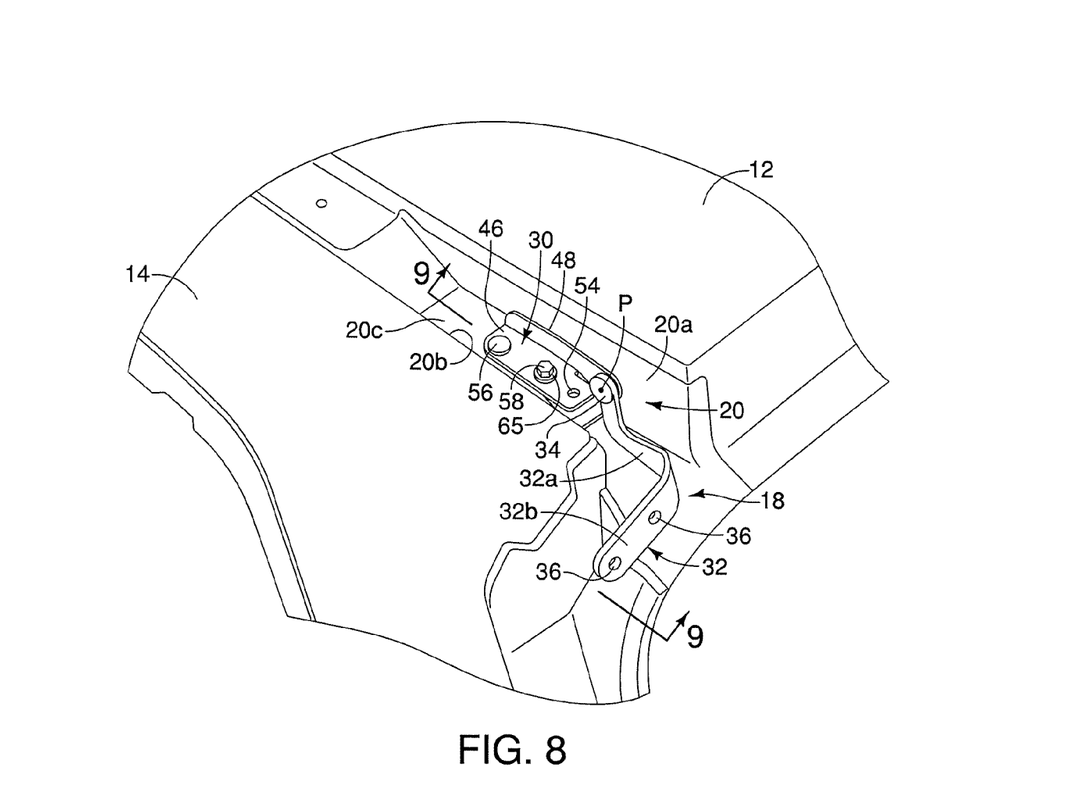
FIG. 8 is an enlarged perspective view of the top rear portion of the vehicle illustrated in FIGS. 1-4, with the vehicle door and a roof ditch cover removed.
Figure 9:
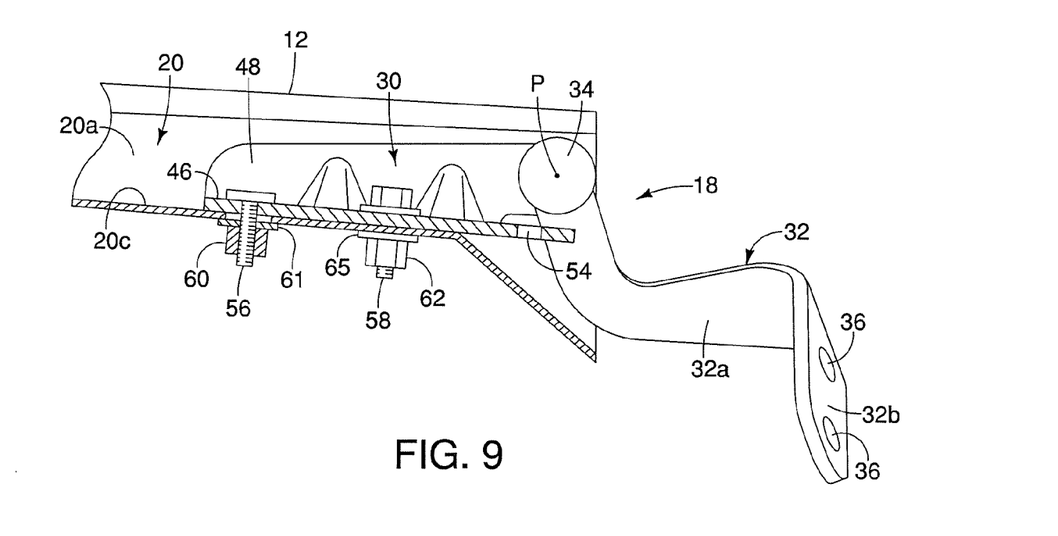
FIG. 9 is a simplified cross sectional view of a portion of a roof body panel and a hinge secured to the roof body panel as seen along section line 9-9 of FIG. 8.
Figure 10:
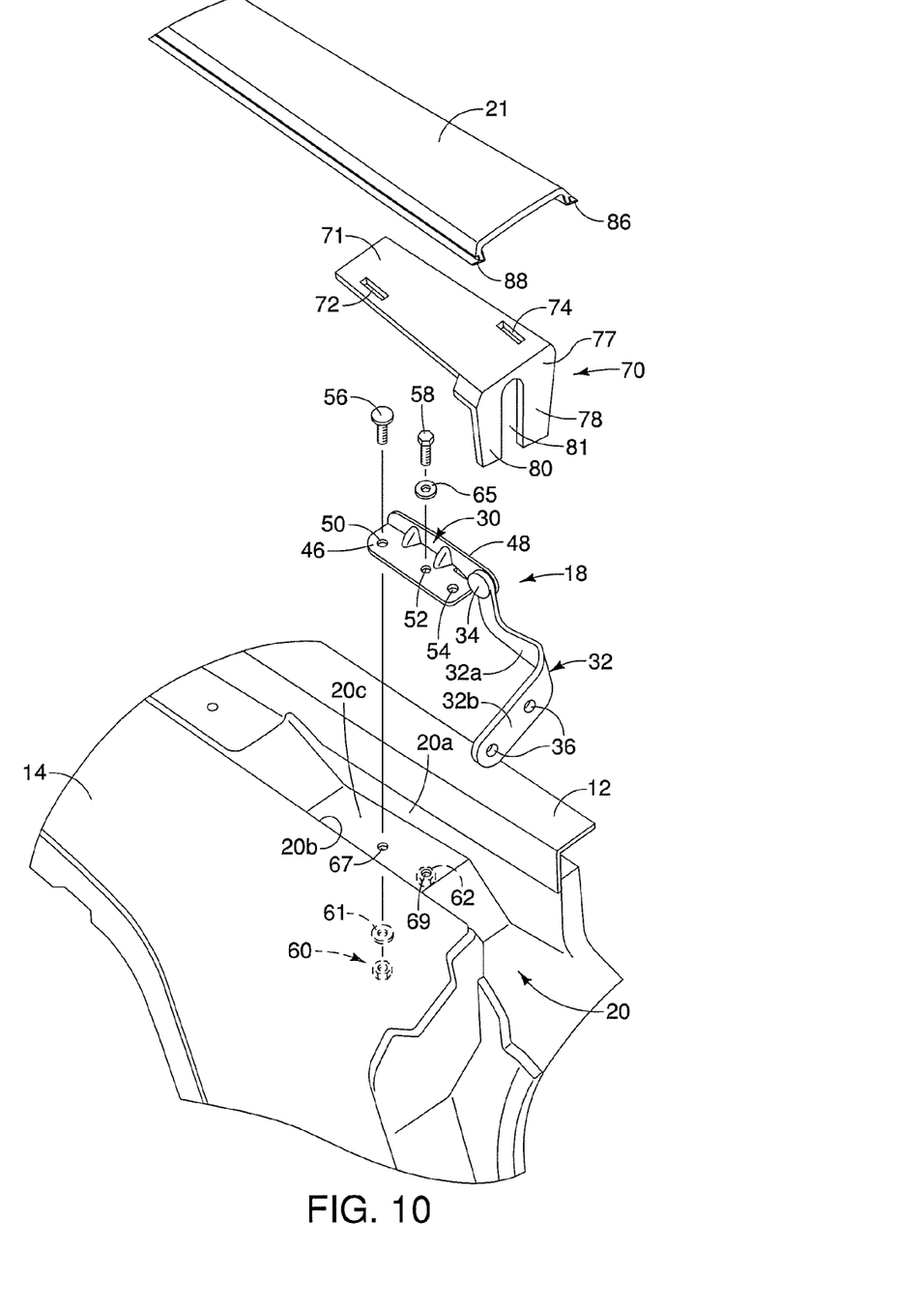
FIG. 10 is an exploded perspective view of selected parts of the top rear portion of the door mounting arrangement of the vehicle illustrated in FIGS. 1-4.
Figure 11:
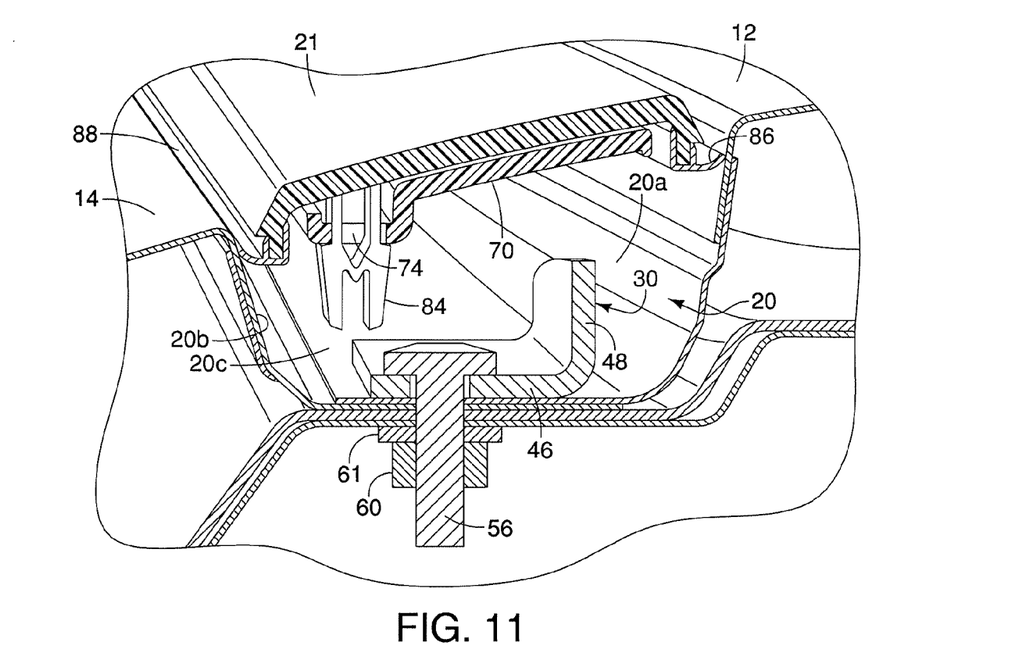
FIG. 11 is a simplified cross sectional view of the top rear portion of the vehicle illustrated in FIGS. 1-4 as seen along section line 11-11 of FIG. 3.
Figure 12:
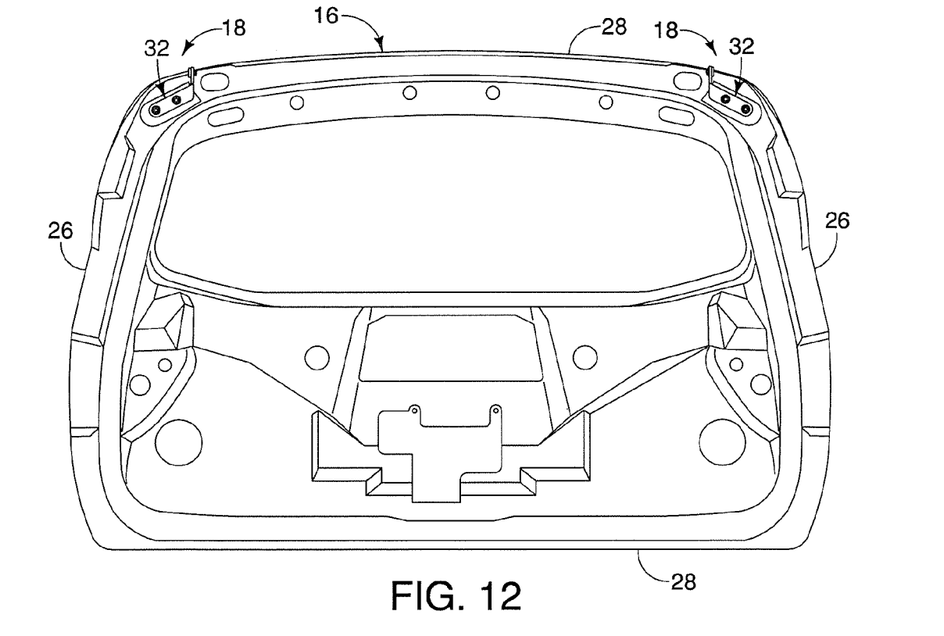
FIG. 12 is an interior elevational view of the rear door of the vehicle illustrated in FIGS. 1-4.

The roof panel 12 includes a pair of roof ditches 20 that are spaced apart along the roof panel 12 in a direction that is perpendicular or substantially perpendicular to a longitudinal direction of the roof ditches 20. As indicated, the side panels 14 are fixed to the roof panel 12 such that the side panels 14 and the roof panel 12 collectively define the roof ditches 20. Each roof ditch 20 is thus a joint that is made by the roof panel 12 and the side panel 14 of the vehicle 10. Also, as shown in FIG. 8, each roof ditch 20 includes an inner wall surface 20a that is within a lateral boundary of the roof panel 12, an outer wall surface 20b that is positioned adjacent to the lateral boundary of the roof panel 12 and a recessed support surface 20c that extends laterally between the bottom edges of the inner and outer wall surfaces 20a and 20b. The inner wall surface 20a extends longitudinally along a first side of the recessed support surface 20c and the outer wall surface 20b extends longitudinally along a second side of the recessed support surface 20c. The outer wall surface 20b is disposed outboard of the inner wall surface 20a.

Figures 5, 6:
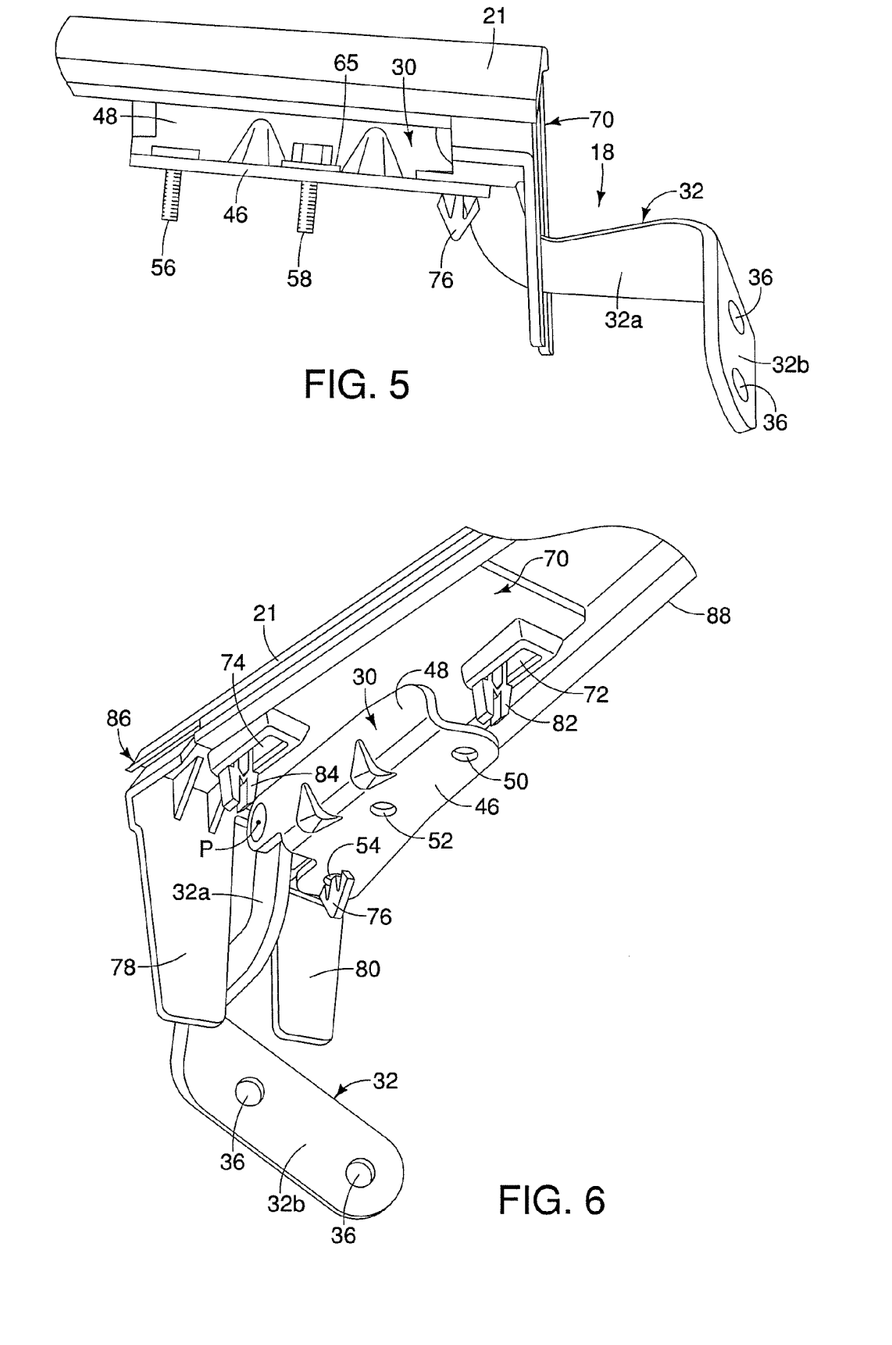
FIG. 5 is a simplified elevational view of the top rear portion of the vehicle illustrated in FIG. 3 showing one of the rear hinge areas of the vehicle body structure in accordance with the illustrated embodiment.
FIG. 6 is a simplified perspective view of the top rear portion of the vehicle illustrated in FIG. 3 showing one of the rear hinge areas of the vehicle body structure in a closed position.
Figure 7:
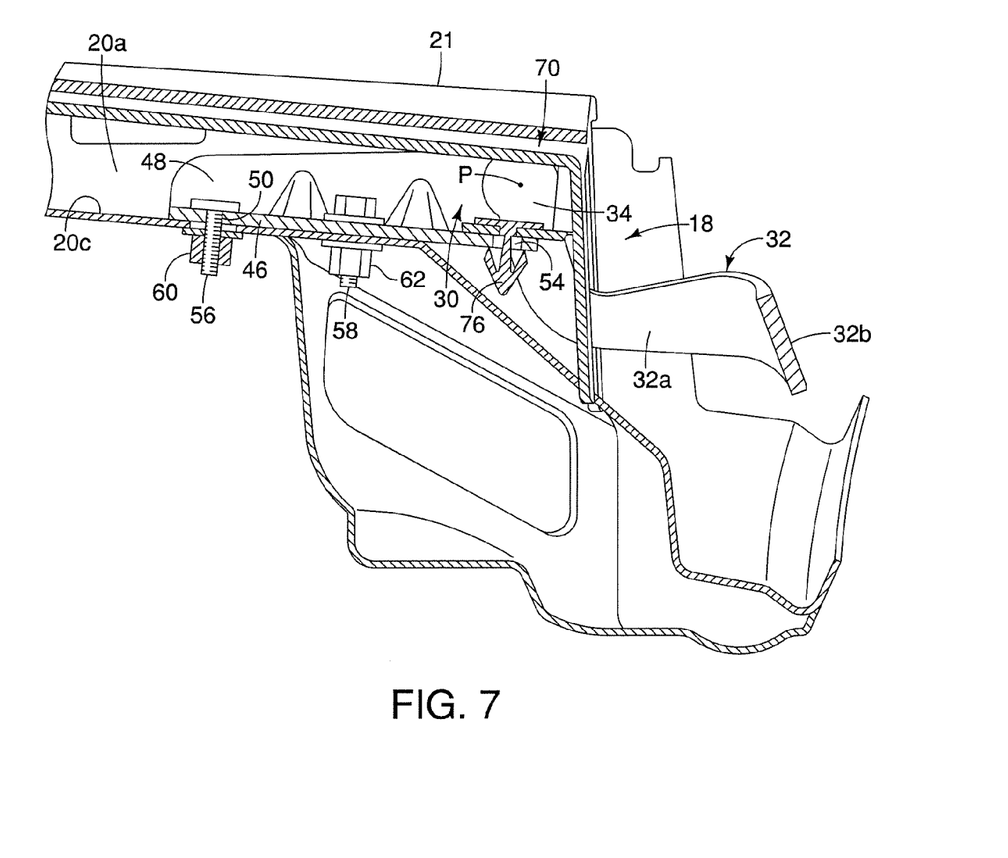
FIG. 7 is a cross-sectional view of the top rear portion of the vehicle illustrated in FIG. 3 showing one of the rear hinge areas of the vehicle body structure in accordance with the illustrated embodiment.

The hinges 18 are mounted in the roof ditches 20 of the roof panel 12 and are each covered by roof ditch molding 21 as discussed in more detail below. The roof ditch molding 21 can be made of plastic or any other suitable material that can have some flexibility. Thus, in the illustrated embodiment, the vehicle door 16 is configured as a rear door (i.e., a lift gate) of the vehicle 10. In other words, the vehicle door 16 is configured as a lift gate with the hinges 18 having horizontally arranged pivot axes P between the roof panel 12 and the vehicle door 16 as shown, for example, in FIGS. 6 and 7. Typically, the pivot axes P extend in directions that are perpendicular or at least transverse to the longitudinal direction of the vehicle 10.

Figure 3:
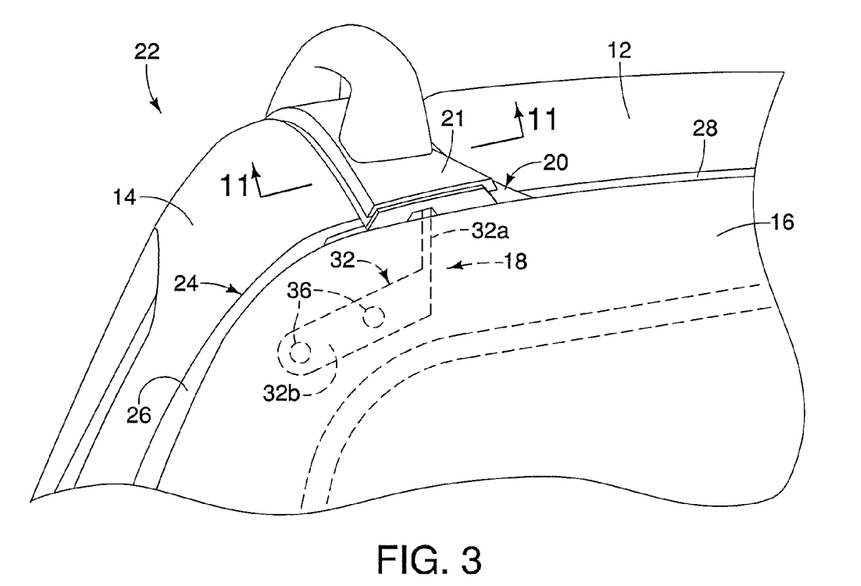
FIG. 3 is an enlarged perspective view of a top rear portion of the vehicle illustrated in FIGS. 1 and 2 showing one of the rear hinge areas of the vehicle body structure in accordance with the illustrated embodiment.
Figure 4:
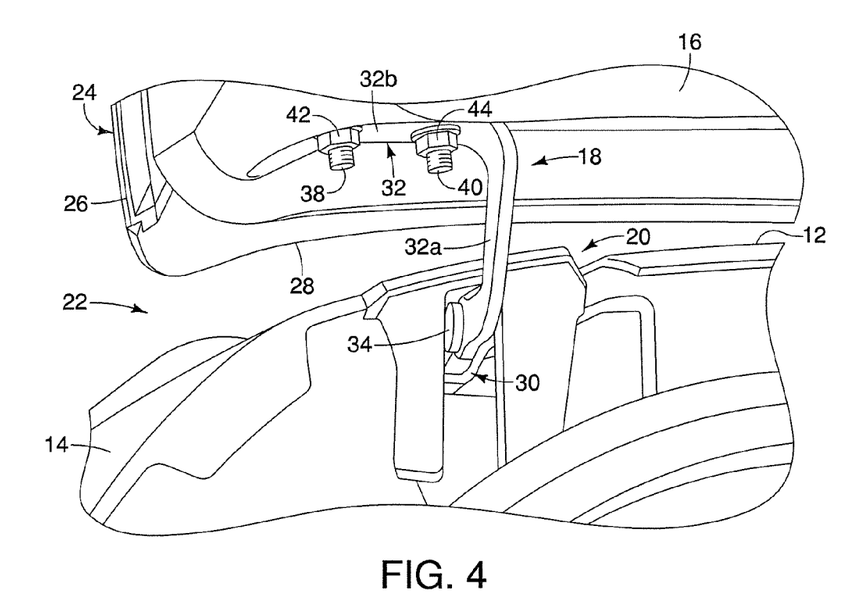
FIG. 4 is an enlarged perspective view of the top rear portion of the vehicle illustrated in FIGS. 1-3, with the vehicle door pivoted to the open position.

As best seen in FIGS. 3 and 4, the roof panel 12, the side panels 14, the vehicle door 16 and the hinges 18 constitute a vehicle body structure 22. The hinges 18 are situated at an upper-rear portion of the vehicle door 16 of the vehicle body structure 22. As will become apparent from the following description of the vehicle body structure 22, the vehicle body structure 22 increases design freedom with respect to the layout of the various components for the vehicle's rear end. Moreover, the vehicle body structure 22 is configured and arranged to improve the structural integrity of the vehicle door 16 with respect to its torsional rigidity. Also, as will become apparent from the following description of the vehicle body structure 22, the vehicle body structure 22 improves design freedom by reducing constraints that limit the positioning of the roof ditches 20 with respect to the outer door edges.

Figure 13:
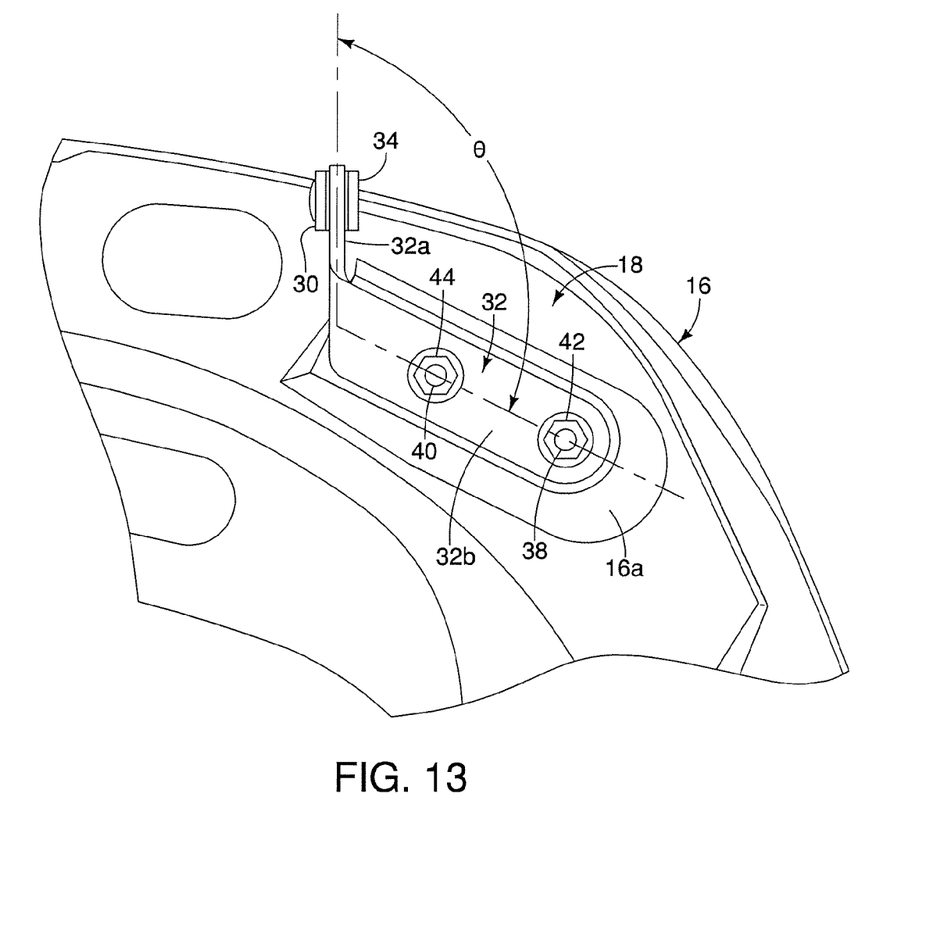
FIG. 13 is an enlarged elevational view of a top corner of the rear door illustrated in FIG. 12.
Figure 14:
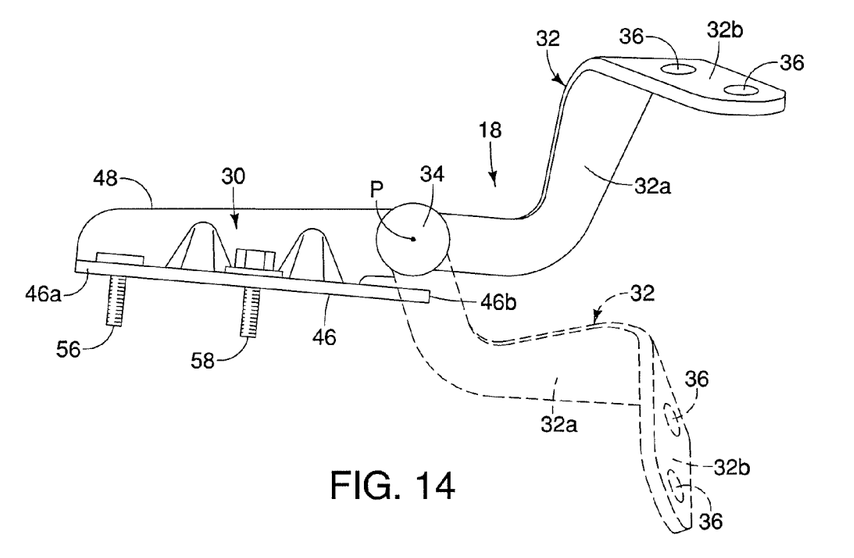
FIG. 14 is a side elevational view of one of the hinges for the vehicle illustrated in FIGS. 1-4.
Figure 15:
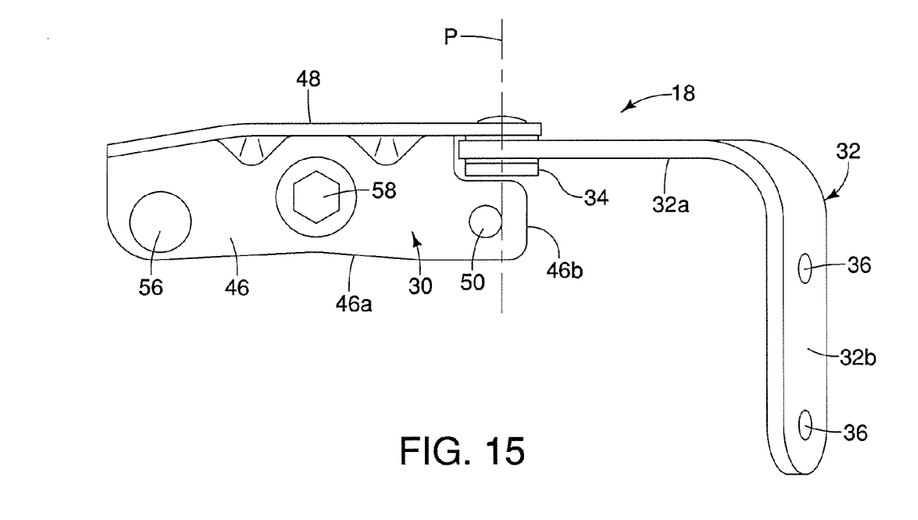
FIG. 15 is a plan view of the hinge illustrated in FIG. 14.

The vehicle door 16 includes an outer peripheral edge portion 24 defining an outer perimeter of the vehicle door 16. The outer peripheral edge portion 24 has a pair of oppositely disposed side edges 26 and a pair of oppositely disposed transverse edges 28. The side edges 26 extend vertically between opposite ends of the transverse edges 28. The transverse edges 28 are generally arranged horizontally between the side edges 26. The vehicle door 16 also includes a hinge mounting surface 16a (FIG. 13) extending laterally with respect to the outer perimeter of the vehicle door 16. The hinge mounting surface 16a includes a generally vertical surface that extends in a lateral direction of the vehicle 10. As further shown in FIG. 13, the hinge mounting surface 16a can extend longitudinally in the direction of the portion of the hinge 18 that attaches to the hinge mounting surface 16a.

Referring to FIGS. 3-10 and 13-15, only one of the hinges 18 is illustrated for the sake of brevity. However, it will be apparent from this disclosure that the hinges 18 are mirror images of each other and that the roof panel 12 is symmetrical with respect to the hinges 18. Basically, each of the hinges 18 includes a base component 30 and an arm component 32.

The pivot axes P of the hinges 18 are generally perpendicularly arranged with respect to a longitudinal direction of the vehicle body structure 22. In other words, the vehicle door 16 is configured as a lift gate with the hinges 18 having the horizontally arranged pivot axes P between the base component 30 and the arm component 32.

As discussed in more detail below, the base component 30 is located in the roof ditch 20. In this way, the vehicle body structure 22 capitalizes on the existing, underlying structure of the vehicle 10 for rigidity. Also by mounting the base component 30 in the roof ditch 20, the vehicle body structure 22 can be formed in a way that reduces the need for additional reinforcement panels by utilizing a tightly packaged ditch area.

The arm component 32 includes an extension portion 32a and a mounting flange 32b. As illustrated, the extension portion 32a, and thus, the arm component 32, is pivotally coupled to the base component 30 by a pivot component 34. In this way, the vehicle door 16 can swing about the pivot axes P of the pivot components 34 of the hinges 18.

The mounting flange 32b, and thus the arm component 32, is mounted to the laterally extending interior surface 16a of the vehicle door 16 at an outboard region of the vehicle door 16 by fasteners that can include a pair of bolts 38 and 40 and a pair of nuts 42 and 44, or any other suitable type of fastening arrangement such as screws, rivets, welding and so on. The fasteners thus constitute a vehicle door mounting structure. In this way, the fasteners (i.e., the vehicle door mounting structure) of the arm component 32 pass through the mounting flange 32b. The fasteners (i.e., the vehicle door mounting structure) thus define two fastening points, respectively. The fastening points of the fasteners (i.e., the vehicle door mounting structure) of the arm component 32 are situated inboard of the side edges 26 of the vehicle door 16.

As further shown, the mounting flange 32b extends away from the extension portion 32a in an outboard direction of the vehicle body structure 22 along the vertical interior surface 16a of the vehicle door 16 that faces an interior of the vehicle body structure 22. The mounting flange 32b extends in an outboard direction of the vehicle body structure 22 along an interior facing surface (i.e., the vertical interior surface 16a) of the vehicle door 16. Also, the mounting flange 32b of the arm component 32 extends along the interior facing surface of the vehicle door 16 in a non-orthogonal direction at an angle θ (FIG. 13) with respect to a plane including the extension portion 32a that extends parallel to a longitudinal direction of the vehicle 10. The angle θ can be greater than 90° and in this example, can be at or about 120°. Naturally, the angle θ can be any suitable angle to achieve the type of vehicle door mounting configuration as discussed herein. By mounting the arm component 32 to the vertical interior surface 16a of the vehicle door 16 at an outboard region of the vehicle door 16, the torsional rigidity of the overall door assembly can be increased.

The base component 30 basically includes a mounting flange 46 and an upright attachment portion 48. The mounting flange 46 extends away from the upright attachment portion 48 in an outboard direction of the vehicle body structure 22 and along the support surface 20c of the roof ditch 20. The mounting flange 46 of the base component 30 has a peripheral edge 46a in a plane parallel to the support surface 20c of the roof ditch 20. A portion 46b of the peripheral edge 46a of the mounting flange 46 that closest to the vehicle door 16 is cantilevered with respect to the roof panel 12. In this way, the base component 30 of the hinge 18 extends beyond a peripheral edge of the support surface 20c closest to the vehicle door 16.

The upright attachment portion 48 is pivotally attached to the extension portion 32a, and thus to the arm component 32, by the pivot component 34, so that the arm component 32 pivots with respect to the base component about pivot axis P. The mounting flange 36 is attached to the roof panel 12 by a pair of fasteners. One of the fasteners can include a bolt 56, a nut 60 and a washer 61 while the other fastener includes a bolt 58, a nut 62 and a pair of washers 63 and 65. The nut 62 and the washer 63 associated with bolt 58 can also comprise an integrally formed weld nut that is welded to an underside of the roof ditch 20 prior to assembly of the vehicle 10. Naturally, any suitable types of fasteners such as screws, rivets and so on can be used. In this arrangement, the bolts 56 and 58 pass through a pair of openings 50 and 52, respectively, in the mounting flange 46 and through a pair of openings 67 and 69, respectively, in the support surface 20c and are secured to the support surface 20c by a pair of nuts 60 and 62. The fasteners thus constitute a vehicle body mounting structure. In this particular arrangement, the head of the bolt 56 is circular and is thus typically more difficult to remove from an exterior of the vehicle 10 than bolt 58, which has a hexagonal head.

Alternatively, the arm component 32 and, in particular, the mounting flange 32b could extend inboard along the vehicle door 16. Furthermore, the arm component 32 could be sandwiched by the base component 30 and extend in both the inboard and outboard directions. Also, if the styling of a particular vehicle 10 provides sufficient clearance, the base component 30 could be flipped (mirrored) positionally in a vehicle lateral direction such that the fasteners 56 and 58 would be located inboard of the upright attachment portion 48.

As further shown, each of the hinges 18 is partially concealed by a cover 70 that is secured to the roof ditch molding 21 as discussed below. The cover 70 can be made of rigid plastic or any other suitable material. The cover 70 includes a top portion 71 having a pair of apertures 72 and 74 defined therein, and a clip 76 (FIG. 5) that extends downward from the top portion 71. The cover 70 further includes a close-out portion 77 having a pair of legs 78 and 80 that extend from a peripheral end edge of the top portion 71 towards the recessed support surface 20c of the roof ditch 20. The legs 78 and 80 define a slot 81 through which the arm component 32 of the hinge 18 passes. The top portion 71 generally spans a width of the roof ditch 20 above the base component 30 of the hinge 18 between respective top edges of the first and second wall surfaces 21a and 21b. The close-out portion 77 extends laterally within the roof ditch 20 from the first wall surface 21a to the second wall surface 21b. The cover 70 and the roof ditch 20 thus define a cavity. The base component 30 of the hinge 18 is situated within the cavity and the vehicle door mounting structure of the arm component 32 is situated outside of the cavity.

Figure 16:
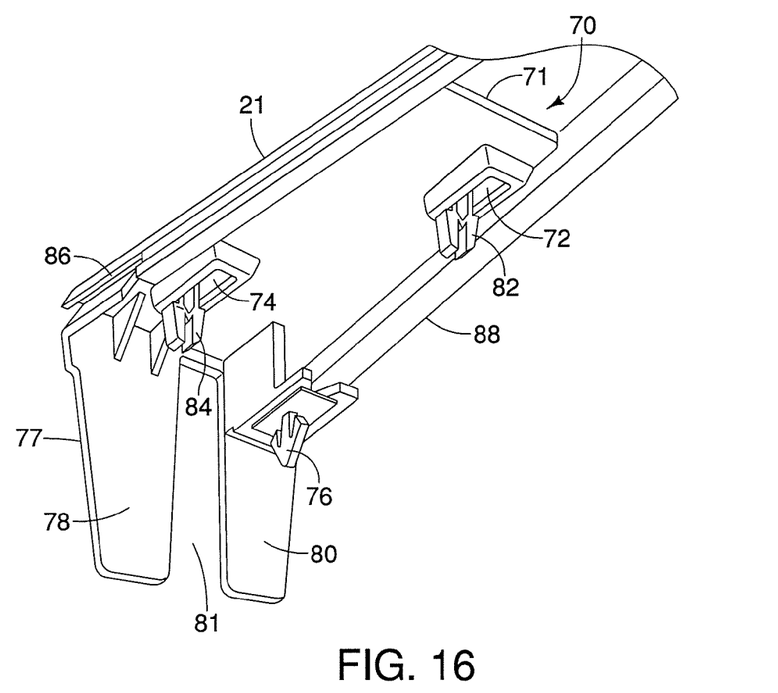
FIG. 16 is a perspective view of selected parts of the roof ditch molding and molding mounting component of the rear door of the vehicle illustrated in FIGS. 1-4.
Figure 17:
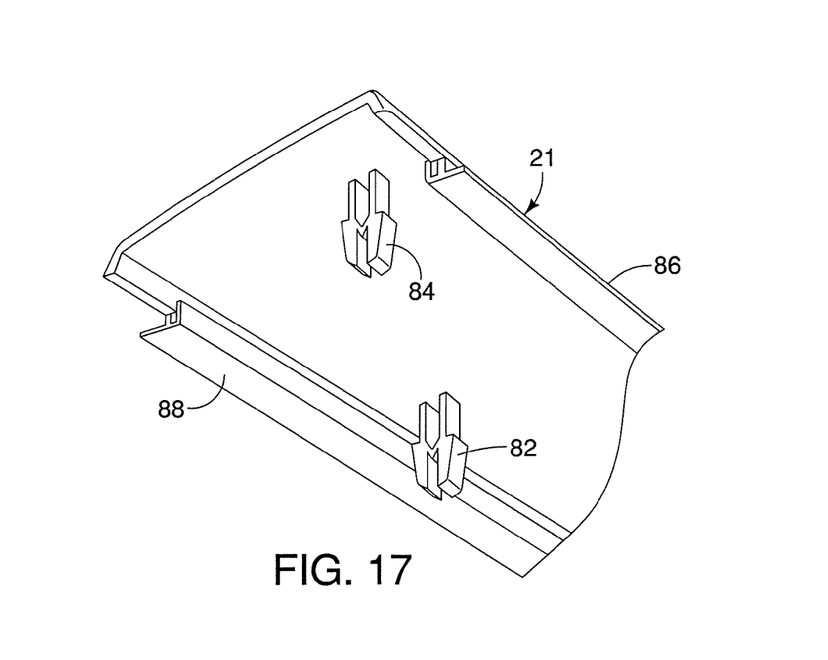
FIG. 17 is a perspective view of selected parts of the roof ditch molding of the rear door of the vehicle illustrated in FIG. 1-4.

Referring now to FIGS. 16 and 17, the clip 76 is received in the aperture 54 defined by the base component 30 of the hinge 18 such that the clip 76 engages a peripheral edge of the aperture 54 to retain the cover 70 to the base component 30 of the hinge 18. The cover 70 is thus a portion of a roof molding assembly that extends along the roof panel 12 in a longitudinal direction of the vehicle body structure 22. In addition, two clips 82 and 84 that extend downward from the roof ditch molding 21 are received in the apertures 72 and 74 defined by the cover 70. The clips 82 and 84 engage respective peripheral edges of the apertures 72 and 74 to retain the roof ditch molding 21 to the cover 70. Furthermore, the opposite longitudinal edges of the roof ditch molding 21 include flexible members 86 and 88 that can be made of rubber, for example. The flexible members 86 and 88 contact the inner and outer wall surfaces 20a and 20b of the roof ditch 20 and thus provide a seal between the roof ditch molding 21 and the roof ditch 20.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below", "longitudinal" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure comprising:
    at least one vehicle body panel including a roof ditch that is defined by a recessed support surface, a first wall surface extending longitudinally along a first side of the recessed support surface and a second wall surface extending longitudinally along a second side of the recessed support surface, with the second wall surface being disposed outboard of the first wall surface;
    a hinge including a base component and an arm component pivotally coupled to the base component, with the base component being mounted to the recessed support surface of the roof ditch and the arm component including a vehicle door mounting structure; and
    a vehicle door being fixed to the arm component by the vehicle door mounting structure, which defines at least one fastening point that is situated at a location outboard of the second wall surface of the roof ditch, the vehicle door mounting structure being attached to an interior surface of the vehicle door that faces a direction parallel to a longitudinal direction of the roof ditch when the vehicle door is closed.

2. The vehicle body structure according to claim 1, wherein
    the vehicle door includes an outer peripheral edge portion defining an outer perimeter of the vehicle door, and a hinge mounting surface extending inside of and adjacent to the outer perimeter of the vehicle door, with the vehicle door mounting structure being fixed to the hinge mounting surface of the vehicle door.

3. The vehicle body structure according to claim 1, wherein
    the vehicle door mounting structure includes a plurality of fasteners such that the at least one fastening point includes a plurality of fastening points defined by respective ones of the fasteners.

4. The vehicle body structure according to claim 1, wherein
    the vehicle door includes an outer peripheral edge portion having a pair of oppositely disposed side edges, and the at least one fastening point defined by the vehicle door mounting structure is situated inboard of each one of the pair of side edges of the vehicle door.

5. The vehicle body structure according to claim 1, wherein
    the vehicle door is configured as a lift gate of the vehicle body structure with the hinge having a horizontally arranged pivot axis between the base component and the arm component.

6. The vehicle body structure according to claim 1, wherein
    the hinge is situated at an upper-rear portion of the vehicle body structure.

7. The vehicle body structure according to claim 1, wherein
    the hinge includes a pivot axis that is perpendicularly arranged with respect to a longitudinal direction of the body structure.

8. The vehicle body structure according to claim 1, wherein
    the at least one vehicle body panel includes a side panel and a roof panel, with the side panel fixed to the roof panel to collectively define the roof ditch.

9. The vehicle body structure according to claim 1, wherein
    the arm component of the hinge includes an extension portion and a mounting flange, with the mounting flange extending away from the extension portion in an outboard direction of the vehicle body structure such that the vehicle door mounting structure of the arm component passes through the mounting flange to engage the vehicle door.

10. The vehicle body structure according to claim 9, wherein
    the mounting flange of the arm component extends away from the extension portion of the arm component in a non-orthogonal direction with respect to a plane including the extension portion of the arm component and extending parallel to a longitudinal direction of the vehicle body structure.

11. The vehicle body structure according to claim 1, wherein
    the base component of the hinge includes a hinge mounting structure, an upright portion, and a mounting flange that extends away from the upright portion along the support surface of the roof ditch such that the hinge mounting structure passes through the mounting flange to engage the support surface.

12. The vehicle body structure according to claim 11, wherein
    the mounting flange of the base component extends away from the upright portion of the base component in an outboard direction of the vehicle body structure.

13. The vehicle body structure according to claim 11, wherein
    the mounting flange of the base component has a peripheral edge in a plane parallel to the support surface of the roof ditch, and a portion of the peripheral edge closest to the vehicle door is cantilevered with respect to the at least one vehicle body panel such that the base component of the hinge extends beyond a peripheral edge of the support surface closest to the vehicle door.

14. The vehicle body structure according to claim 1, further comprising
    the at least one vehicle body panel including an additional roof ditch that is defined by an additional recessed support surface, an additional first wall surface extending longitudinally along a first side of the additional recessed support surface and an additional second wall surface extending longitudinally along a second side of the additional recessed support surface, with the additional second wall surface being disposed outboard of the additional first wall surface; and
    an additional hinge including an additional base component and an additional arm component pivotally coupled to the additional base component, with the additional base component being mounted to the additional recessed support surface of the additional roof ditch and the additional arm component including an additional vehicle door mounting structure, the vehicle door being fixed to the additional arm component by the additional vehicle door mounting structure, which defines at least one additional fastening point that is situated at a location outboard of the additional second wall surface of the additional roof ditch,
    the roof ditch and the additional roof ditch being spaced apart along the at least one vehicle body panel in a direction that is perpendicular to a longitudinal direction of the roof ditch and the additional roof ditch.

15. The vehicle body structure according to claim 1, wherein
    the vehicle door mounting structure includes a fastener that passes through the arm component and the vehicle door at the fastening point and along a fastener insertion axis that is perpendicular to a pivot axis of the hinge.

16. The vehicle body structure according to claim 1, wherein
    the arm component further includes an extension portion and a mounting flange, the mounting flange extending away from the extension portion in a direction that is substantially perpendicular to a longitudinal direction of the roof ditch.

17. A vehicle body structure comprising:

at least one vehicle body panel including a roof ditch that is defined by a recessed support surface, a first wall surface extending longitudinally along a first side of the recessed support surface and a second wall surface extending longitudinally along a second side of the recessed support surface, with the second wall surface being disposed outboard of the first wall surface;

a hinge including a base component and an arm component pivotally coupled to the base component, with the base component being mounted to the recessed support surface of the roof ditch, and the arm component including a vehicle door mounting structure, an extension portion and a mounting flange, the mounting flange extending away from the extension portion in a direction that is substantially perpendicular to a longitudinal direction of the roof ditch; and a vehicle door being fixed to the arm component by the vehicle door mounting structure, which defines at least one fastening point that is situated at a location outboard of the second wall surface of the roof ditch.

18. The vehicle body structure according to claim 17, wherein the vehicle door mounting structure includes a fastener that passes through the arm component and the vehicle door at the fastening point and along a fastener insertion axis that is perpendicular to a pivot axis of the hinge.

19. A vehicle body structure comprising:

at least one vehicle body panel including a roof ditch that is defined by a recessed support surface, a first wall surface extending longitudinally along a first side of the recessed support surface and a second wall surface extending longitudinally along a second side of the recessed support surface, with the second wall surface being disposed outboard of the first wall surface;

a hinge including a base component and an arm component pivotally coupled to the base component, with the base component being mounted to the recessed support surface of the roof ditch and the arm component including a vehicle door mounting structure; and a vehicle door being fixed to the arm component by the vehicle door mounting structure, which defines a fastening point that is situated at a location outboard of the second wall surface of the roof ditch, with the vehicle door mounting structure including a fastener that passes through the arm component and the vehicle door at the fastening point and along a fastener insertion axis that is perpendicular to a pivot axis of the hinge.

20. The vehicle body structure according to claim 19, wherein the arm component further includes an extension portion and a mounting flange, the mounting flange extending away from the extension portion in a direction that is substantially perpendicular to a longitudinal direction of the roof ditch.

* * * * *